United States Patent Office 3,766,084
Patented Oct. 16, 1973

3,766,084
METHOD OF PREPARING AN ULTRAVIOLET-EMITTING PHOSPHOR
Edward C. Malarkey, Severna Park, Michael R. Natale, Baltimore, and Jon W. Ogland, Glen Burnie, Md., assignors to Westinghouse Electric Corporation, Pittsburgh, Pa.
Filed Aug. 16, 1971, Ser. No. 172,073
Int. Cl. C09k 1/54
U.S. Cl. 252—301.6 F  3 Claims

ABSTRACT OF THE DISCLOSURE

An ultraviolet-emitting cathodoluminescent phosphor comprising $Sr_2ZnSi_2O_7$:Pb (0.6% to 1.0% molar) wherein Pb substitutes in part for Sr and Zn is prepared, by heating in powder form a mixture of silicon dioxide, strontium carbonate, strontium fluoride, zinc oxide and lead oxide in an atmosphere of flowing air and steam at a temperature in the range of about 1275° C. to 1325° C. The resulting material, in which lead acts as an activator, gives radiant ultraviolet outputs approaching 1 kilowatt/cm.$^2$ at 2.5% efficiency under extremely high current density excitation in very high resolution cathode-ray tubes.

BACKGROUND OF THE INVENTION

As is known, most cathode-ray tubes, such as television receiver tubes, are provided with a phosphor on their face which will emit visible light when scanned or otherwise bombarded with electrons. In contrast to phosphors of this type which emit in the visible region, there has been an increasing demand for ultraviolet-emitting cathodoluminescent materials which emit radiation in the near ultraviolet spectral region between about 3000 and 3500 angstrom units for such applications as optical surveillance, secure optical communications, and high resolution recording on ultraviolet-sensitive dry-process film. A suitable phosphor of this type must have an energy conversion efficiency in excess of 1%, a high radiance capability with no saturation of output at input current densities greater than 1 amp/cm.$^2$, and a high resolution capability. In addition, the luminescent decay time or persistence of the phosphor must be on the order of 1 microsecond or less to the 10% of initial intensity point; and the phosphor must have sufficiently high durability to allow many hours of useful tube life at extremely high current densities.

SUMMARY OF THE INVENTION

In accordance with the present invention, a cathodoluminescent phosphor material is provided which emits radiation in the near ultraviolet spectral region and which has all of the desirable characteristics enumerated above. Specifically, the phosphor of the invention comprises $Sr_2ZnSi_2O_7$:Pb (0.6 to 1.0% and preferably 0.8% molar). Lead is substitutionally added as an activator, the designation of 0.8% molar, for example, meaning that for every 1000 molecules of the pure compound 24 lead ions are substituted for strontinum and zinc. That is, for every 1000 molecules of the pure compound, there are 2000 strontium ions and 1000 zinc ions. Substituting 0.8% molar lead ion replaces a total of 24 metal ions, 16 strontium ions and 8 zinc ions. The formula of the phosphor, therefore, can be represented as $Sr_{2-2x}Zn_{1-x}Si_2O_7$:$Pb_{3x}$ where $x$ is in the range of .006 to 0.01. This material has its cathodoluminescent emission peak at 3300 angstrom units, and exhibits all of the desirable characteristics cited above.

Figure 1:
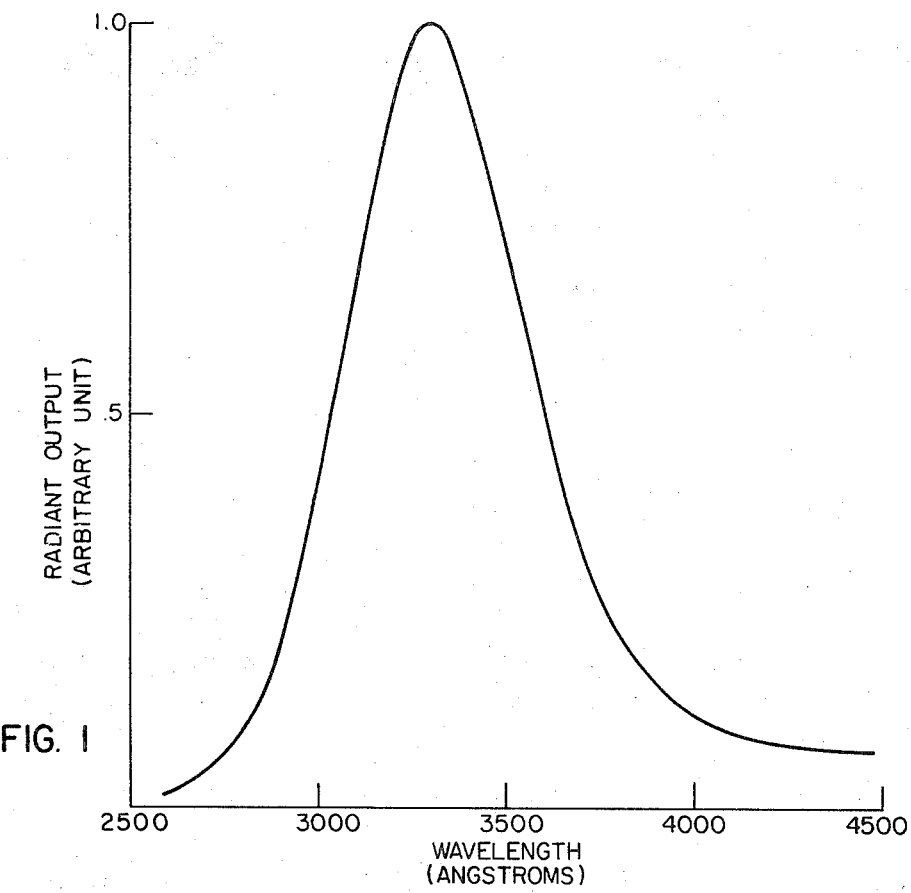
Figure 2:
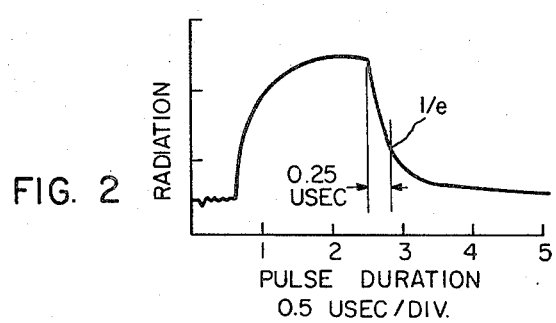

The above and other objects and features of the invention will become apparent from the following detailed description taken in connection with the accompanying drawings which form a part of this specification, and in which:

FIG. 1 is a plot showing the cathodoluminescent spectrum of the phosphor of the invention; and
FIG. 2 is a plot showing the luminescent decay time of the phosphor of the invention.

In carrying out the invention, it is preferable that the cathodoluminescent material be formed from reagent grade chemicals which yield a product which is superior to that obtained with spectroluminescent grade starting materials. For this reason, the phosphor of the invention is preferably formed from reagent grade chemicals.

The phosphor is formed by firing a mixture, in powder form, of silicon dioxide, strontium carbonate, zinc oxide and lead oxide. The silicon dioxide is actually added as silicic acid which has an assay of approximately 82% silicon dioxide. Although strontium can be added as an oxide, it is usually added as the carbonate which quickly decomposes to the oxide at the firing temperature; while zinc and lead are added as oxides as noted above. It is a geneneral practice in silicate phosphor preparation to replace a fraction of the metal oxides with metal fluorides to promote the solid-state reaction and to improve the crystallinity of the product. Thus, the samples are preferably but not necessarily fluxed by replacing 1% of the metal oxides with stronium fluoride. The molar ratios of the starting materials used in the preparation of the phosphor of the invention doped at 0.%8 molar are as follows:

TABLE I

| Material: | Molar ratio |
|---|---|
| $SiO_2$* | 2.000 |
| $SrCO_3$ | 1.954 |
| $SrF_2$ | 0.030 |
| $ZnO$ | 0.992 |
| $PbO$ | 0.024 |

*Actually added as silicic acid at a molar ratio of 2.440.

The foregoing materials, in dry powder form, and in stoichiometric proportions, can be intimately and thoroughly mixed by ball-milling for an extended period of time, about 15–20 hours. However, an equivalent degree of mixing can be effected by adding acetone and wet-milling for 2 hours. After the two-hour ball-milling with acetone added, the mixed sample batch is collected in a fritted-glass filter and the acetone is aspirated through the frit. Suction is applied continuously for 2 to 3 hours to completely dry the powders, which are then ready for firing.

Firing is carried out in a tubular furnace fitted with a fused quartz liner tube. The optimum firing temperature for the phosphor material is in the range between about 1275° C. and 1325° C., and preferably 1300° C. The samples are fired in open platinum boats under an atmosphere of flowing air and steam obtained by bubbling breathing grade compressed air thorugh a reservoir of boiling double-distilled water. Experiments show that a firing duration of eight hours is near optimum. Shorter firing durations yield lower phosphor efficiencies, while longer durations lead to loss of the dopant ion (i.e., lead). After firing, the resulting powder comprising $Sr_2ZnSi_2O_7$:Pb (0.8% molar) is applied to the face of a cathode-ray tube in accordance with standard techniques. That is, it will settle onto the surface of a cathode-ray tube from a water suspension containing strontinum acetate and potassium silicate which combine to form a gel comprising a binder for the phosphor.

The emission spectrum of $Sr_2ZnSi_2O_7$:Pb is shown in FIG. 1. The peak lies at about 3300 angstrom units; while the half-wave intensity bandwidth is approximately 700 angstrom units. These parameters are unaffected by variations in the lead doping concentration over the range of 0.6 to 1.0% molar; and although the concentrations can vary in this range, 0.8% molar is desired. Doping concentrations above 1.0% molar (e.g., 1.2% and 1.4%) have been found to give inferior results.

The absolute energy conversion efficiencies of phosphors with 0.6, 0.8 and 1.0% molar lead doping were measured and found to be nearly identical. Values of approximately 3% were observed for all three compositions at low to moderate current densities. Two high resolution screens of the phosphor of the invention exhibited efficiencies of approximately 2.5% at 30 kilovolts and current densities in the range of about 1 amp/cm.$^2$. The radiance at these power densities approaches 1 kilowatt/cm.$^2$. The same two high resolution screens exhibited spot size capabilities of 0.0021 inch in cathode-ray tubes equipped with electron gun structures that give spot sizes of 0.0017 inch with screens of commercially available high resolution phosphors.

The luminescent decay time of the phosphor of the invention is illustrated in FIG. 2. It is found to be 0.5 microsecond to the 10% of initial intensity point and 0.25 microsecond to the 1/e point.

The durability of a phosphor is usually specified in terms of the accumulated charge density required to reduce the efficiency to 50% of its initial value, and in order to preclude phosphor screen damage due to overheating, such tests are usually conducted at power inputs of about 1 watt/cm.$^2$. Screens of the phosphor of the invention have been subjected to aging tests in a demountable cathode-ray tube at average power densities of about 3 watts/cm.$^2$, and they showed a very satisfactory maintenance value of 11 coulombs/cm.$^2$.

Although the invention has been shown in connection with a certain specific embodiment, it will be readily apparent to those skilled in the art that various changes may be made to suit requirements without departing from the spirit and scope of the invention.

We claim as our invention:

1. A method for preparing an ultraviolet-emitting cathodoluminescent phosphor comprising the steps of mixing together in dry powder form stoichiometric quantities of ZnO, PbO, a compound selected from the group consisting of SiO$_2$ and silicic acid, and a compound selected from the group consisting of SrCO$_3$ and SrO, and heating said mixture in an atmosphere of flowing air and steam at a temperature in the range of about 1275° C. to 1325° C. for about eight hours to form the compound $$Sr_{2-2x}Zn_{1-x}Si_2O_7:Pb_{3x}$$

where Pb is substitutionally added as an activator in the amount of about 0.6 to 1.0% molar such that $x$ is in the range of .006 to 0.01.

2. The method of claim 1 wherein said mixture in dry powder form is heated at a temperature of 1300° C. for about eight hours.

3. The method of claim 1 including the step of milling said mixture before it is heated.

References Cited
UNITED STATES PATENTS

| | | | |
|---|---|---|---|
| 3,157,602 | 11/1964 | Ropp | 252—301.6 F |
| 3,109,820 | 11/1963 | Ropp | 252—301.6 F |
| 2,628,944 | 2/1953 | Nagy | 252—301.6 F |
| 2,846,403 | 8/1958 | Hoekstra et al. | 252—301.6 F |
| 2,965,579 | 12/1960 | Cox et al. | 252—301.6 F |
| 2,975,143 | 3/1961 | Hoekstra | 252—301.6 F |

FOREIGN PATENTS 1,145,287  9/1963  Germany.

EDWARD J. MEROS, Primary Examiner

J. COOPER, Assistant Examiner